Feb. 23, 1960
P. F. DARBY
2,925,636
SKULL TYPE FURNACE
Filed July 17, 1956
6 Sheets—Sheet 1
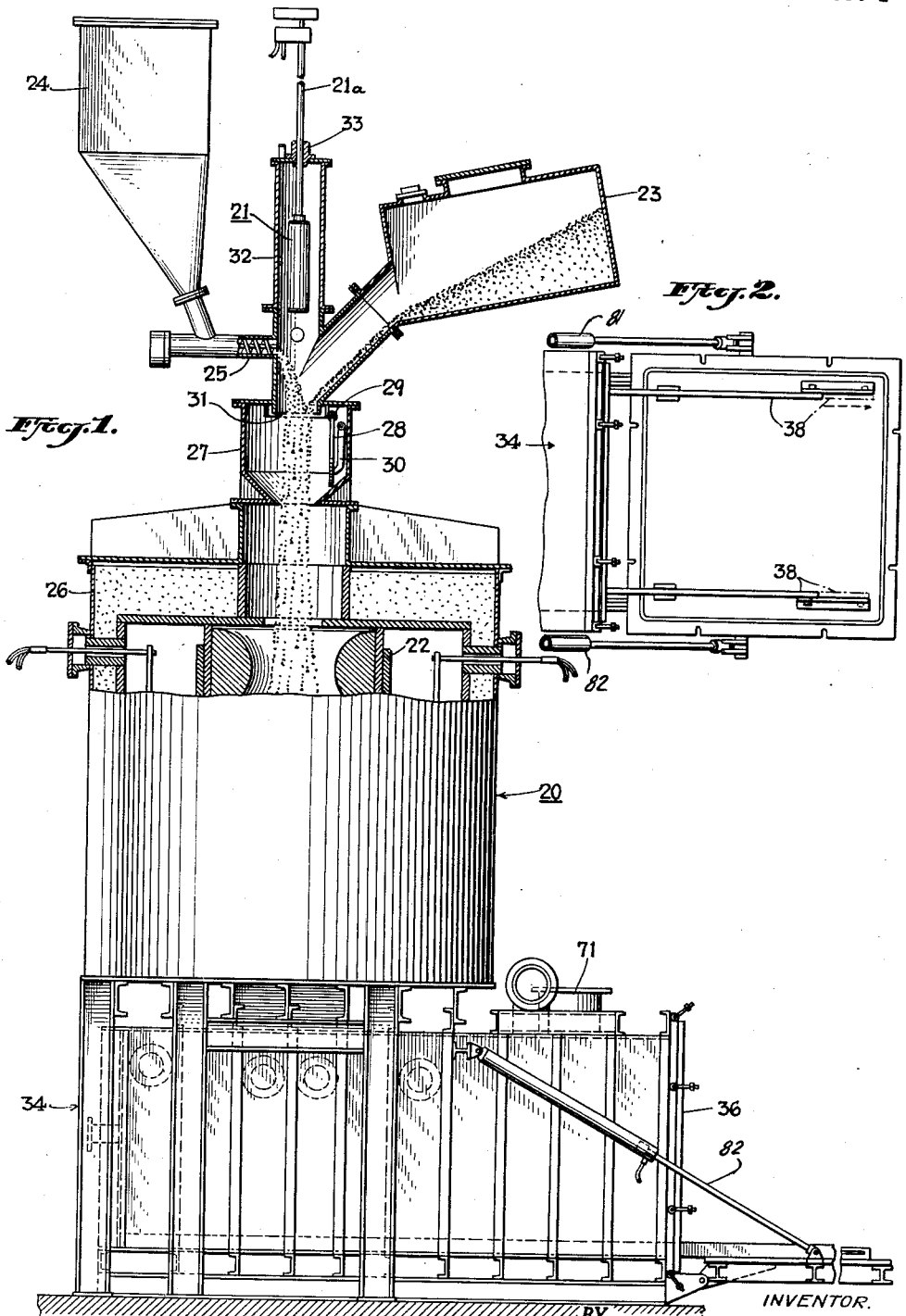
INVENTOR.
PAUL F. DARBY.
BY Ward Neal Haselton Orme & McElhannon.
ATTORNEYS.

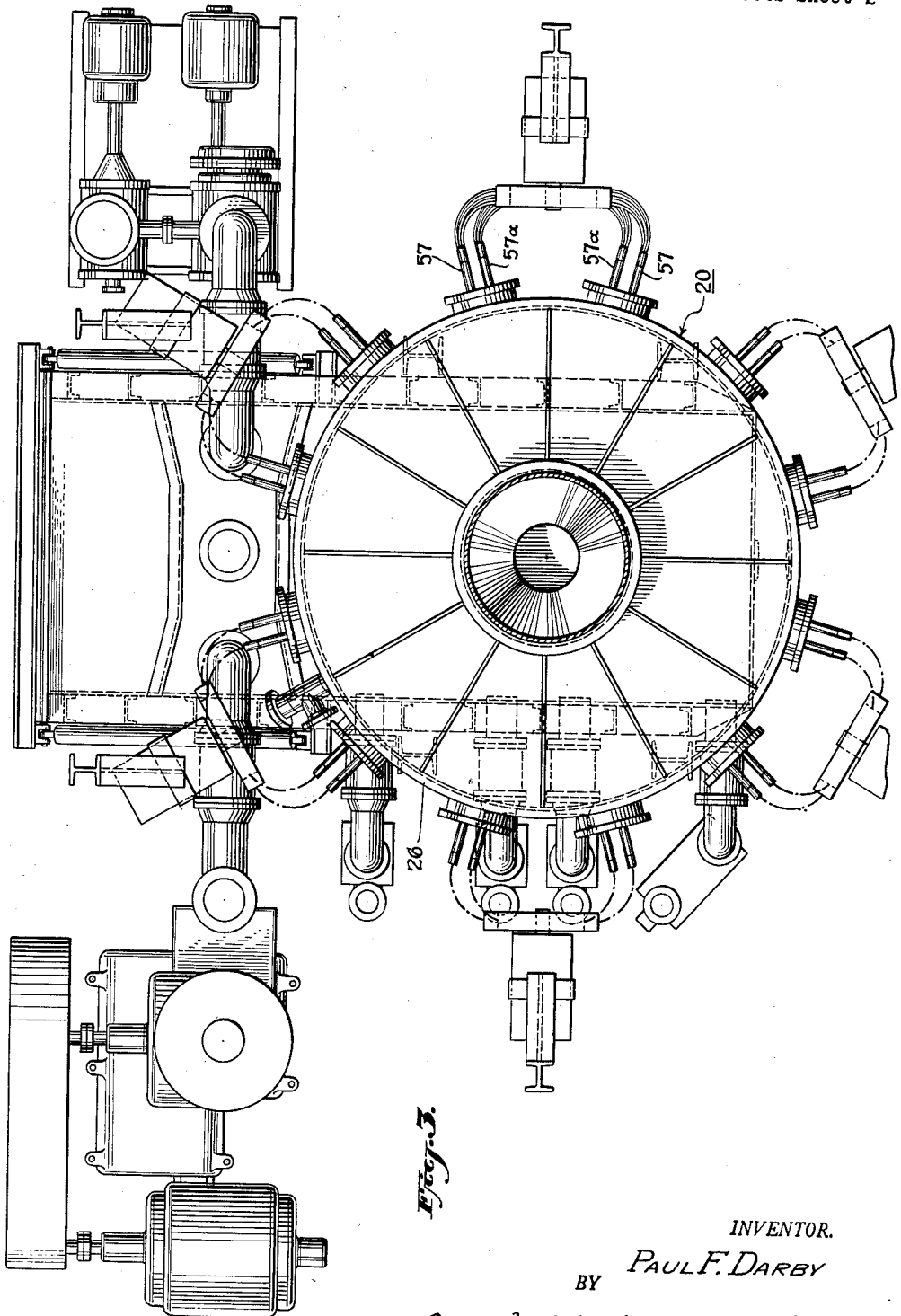

Feb. 23, 1960
P. F. DARBY
2,925,636
SKULL TYPE FURNACE
Filed July 17, 1956
6 Sheets-Sheet 3
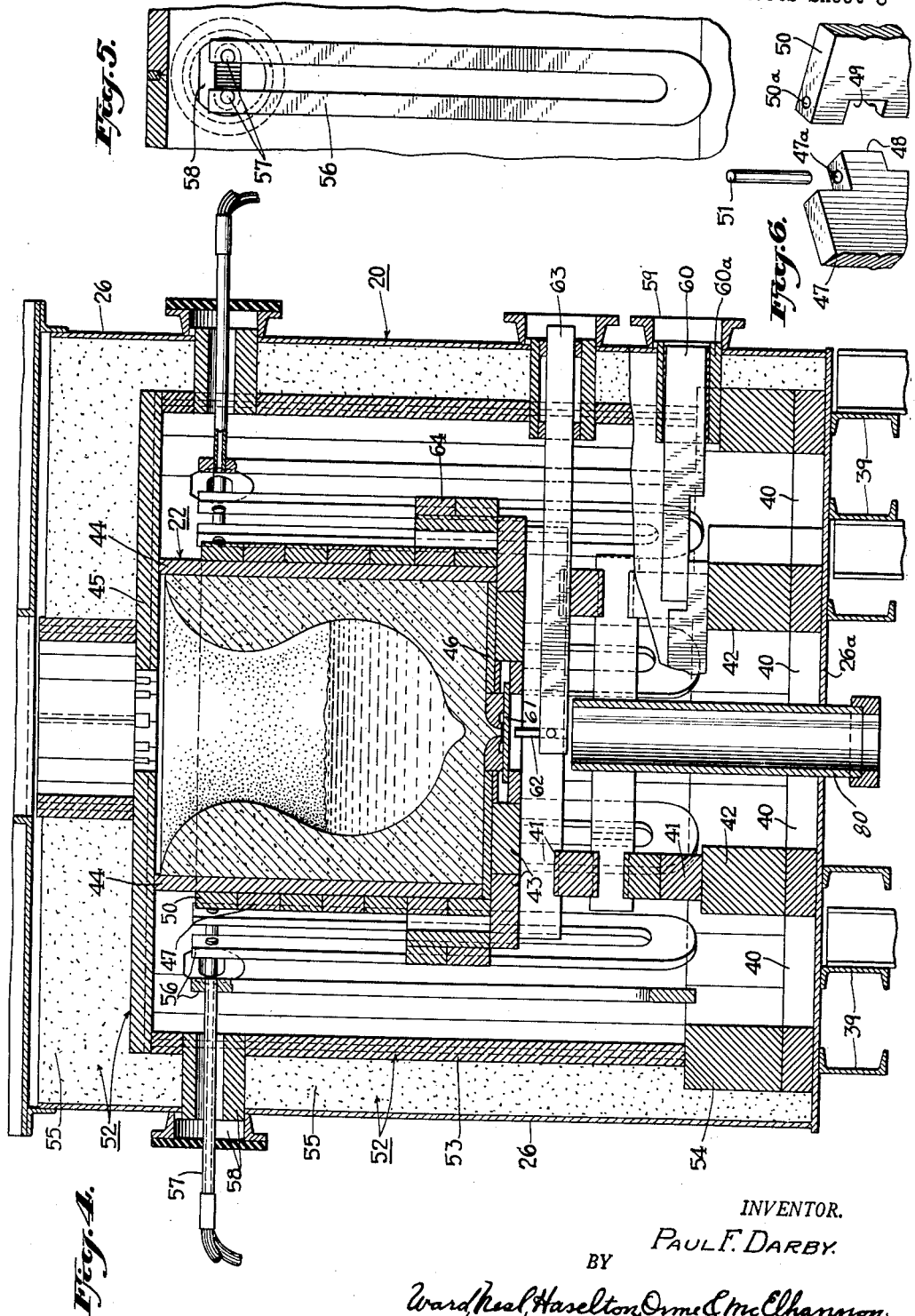
INVENTOR.
PAUL F. DARBY.
BY
Ward, Neel, Haselton, Orme & McElhannon
ATTORNEYS.

Feb. 23, 1960

P. F. DARBY 2,925,636

SKULL TYPE FURNACE

Filed July 17, 1956

INVENTOR.
PAUL F. DARBY.
BY
Ward, Neal, Haselton, Orme & McElhannon
ATTORNEYS.

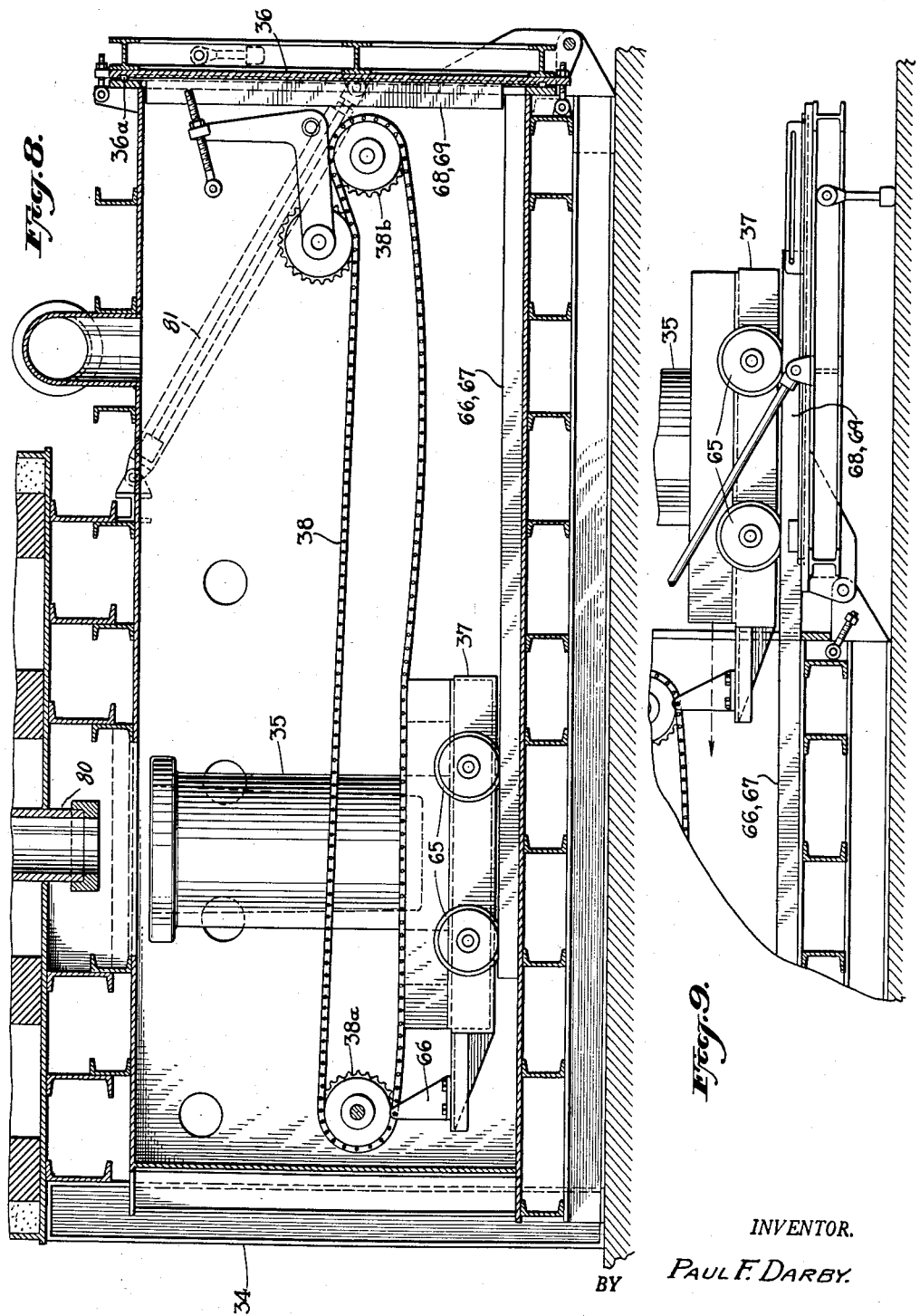

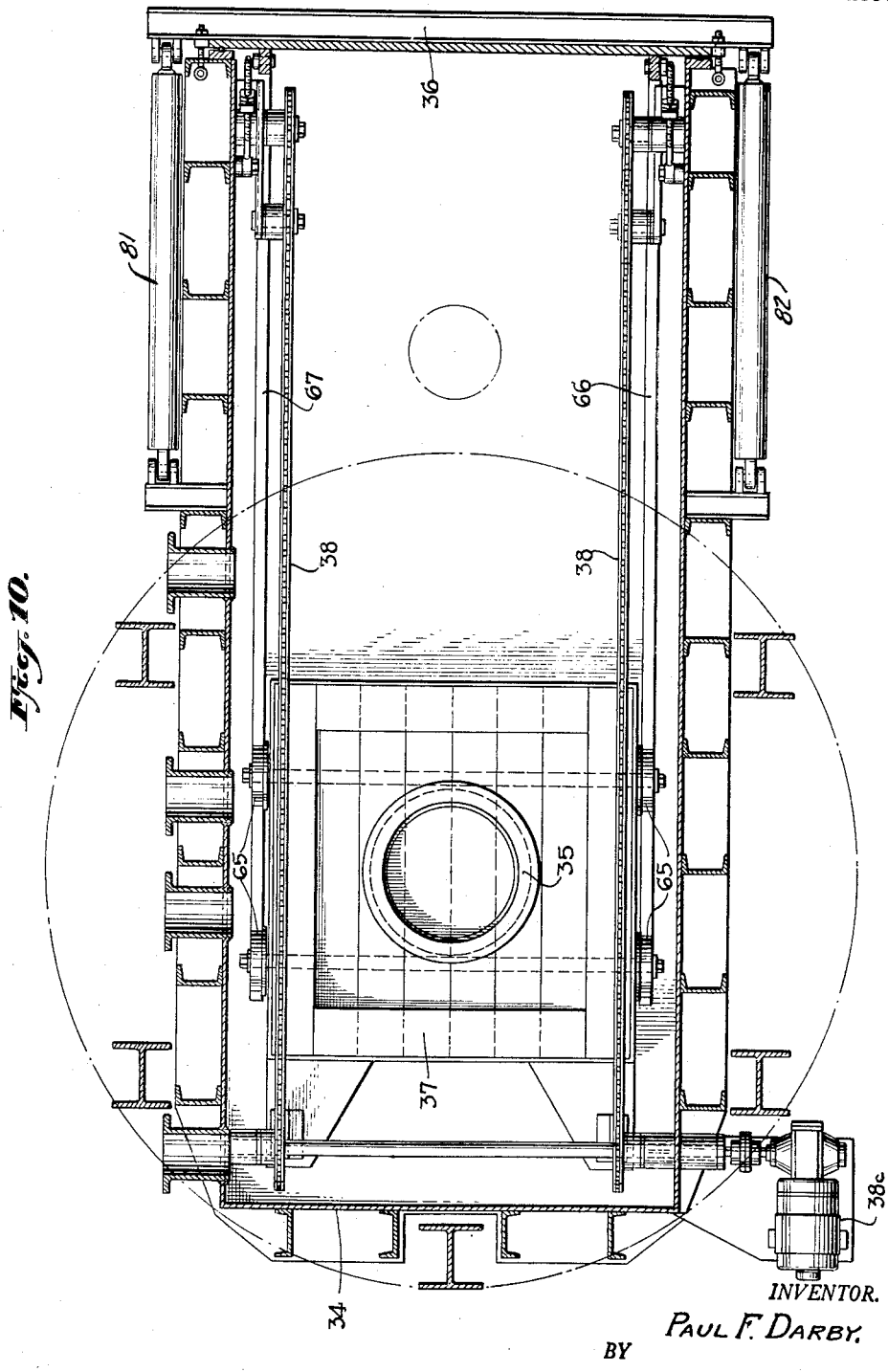

United States Patent Office 2,925,636
Patented Feb. 23, 1960

2,925,636

SKULL TYPE FURNACE

Paul F. Darby, Beaver, Pa., assignor, by mesne assignments, to Crucible Steel Company of America, Flemington, N.J., a corporation of New Jersey Application July 17, 1956, Serial No. 599,674

13 Claims. (Cl. 22—79)

This invention relates to the melting and casting of refractory materials which, in the molten state, show high chemical reactivity such, for example, as titanium, zirconium and alloys thereof with other metals. The invention also relates to a novel furnace construction and operation for the melting and casting of such materials.

This application is a continuation-in-part of my copending application Serial No. 318,046, filed October 31, 1952, and Serial No. 453,345, filed August 31, 1954.

More specifically, the invention contemplates certain novel apparatus for the melting of the metal titanium and its alloys. Titanium melts at a temperature of about 1725° C., and, in the molten state, is so highly reactive that it attacks and destroys all such high temperature refractories as alumina, zirconia, thoria, and graphite. In contact with refractory oxides, it appears not only to extract the oxygen but to combine with the reduced metal. In contact with graphite or non-graphitic carbon, it combines with the carbon, forming a carbide which is soluable in the melt, leaving the carbon surface exposed to further attack. Melts of relatively low quantities of titanium have been made by arc melting in a protective atmosphere by supporting titanium sponge or powder to be melted upon a surface of carbon or water-cooled copper. The melt does not wet the supporting surface, and remains substantially uncontaminated but the quantity which can be melted in this manner is limited to a relatively few grams. Titanium ingots of substantial size have been made by melting a water-cooled copper crucible, the sponge to be melted being gradually fed into the arc and the arc being lifted with respect to the crucible as a solid ingot is built up. In such an arrangement, the molten titanium immediately freezes on contact with the crucible wall, leaving only a small pool of molten metal in the top of the ingot. The relatively small amount of metal which is molten at any one time renders it difficult consistently to produce homogeneous ingots, and this method and the constructions used therewith do not lend themselves to the production of cast shapes of other than the simplest configuration.

The present invention comprises a novel arc, bottom pour skull furnace and methods of operation thereof, in which bodies of molten titanium of substantial size can be obtained, and then transferred to molds to form castings of a desired configuration. Such bodies of molten titanium aforementioned, for example, can be of about 1000 lbs. in weight and such furnace will produce more homogeneous alloys and is capable of melting scrap of substantially any size from extremely fine powder up to the largest size pieces of sponge which can fit into the cavity of the skull in the skull furnace.

The novel furnace in substantially all of its parts, except the outer metal housing, is constructed of graphite slabs, planks, supports and bricks. Graphite as opposed to carbon is largely used because graphite is subject to much less gaseous evolution on heating than is carbon. Consequently, the furnace is much easier to degasify by subjecting same to high temperature prior to initiating the actual melt.

The invention in one aspect thereof is constituted by a metallurgical furnace and appurtenant apparatus for melting and casting the aforementioned highly refractory and reactive metals and is constituted by a substantially gastight housing in which is situated a crucible, together with a first heating means for electrically heating the interior of the crucible thereby to form a skull and a melt within the skull, in the manner hereinafter described. The crucible includes a plurality of interlocked graphite planks comprising the bottom thereof and a plurality of connected solid graphite elements comprising the sides thereof. Such solid graphite elements comprise vertically disposed graphite planks surrounded by a plurality of interlocked and relatively smaller graphite bricks or bricklike elements. Such crucible is supported in spaced relationship to the bottom of the housing by means of a plurality of porous carbon blocks which rest upon the bottom of the housing. Suitable thermal insulating means are interposed between the aforementioned crucible and the outer gastight housing, such means including a base of porous carbon blocks also resting upon the bottom of the housing, such blocks supporting a layer of solid graphite elements, the blocks and elements being in spaced relationship to such housing. A layer of comminuted graphite is interposed between the housing and said porous carbon blocks and solid graphite elements. In order to provide for suitable degasifying (outgassing), auxiliary heating means are interposed between the thermal insulating means aforedescribed and the sides of the crucible and include a plurality of hairpin-like elongated heating elements or resistors disposed peripherally about the crucible. In view of the fact that one of the important design problems which have been solved by the present invention is that of proper insulation in order to achieve a melt of the magnitude herein involved, the concomitant problem arises of the outgassing of such insulation thereby to insure that the melt will not be contaminated by whatever gases may have been absorbed by the insulation. Consequently the aforementioned heating means are employed which are so disposed peripherally about the crucible and which cooperate with other heating means which are specifically employed for heating the interior of the crucible. The first-mentioned heating means which are so peripherally disposed about the crucible preferably extend from substantially the uper level of the crucible to a point substantially below the floor of the latter and hence such elongated heating elements extend from substantially the top to the bottom of the interior of the furnace. This will assist in the uniform heating of the entire insulating means employed within the furnace thereby further to insure a desired degasifying thereof which occurs at a higher temperature than that encountered in the actual melting. That is, the interior parts of the furnace are heated to a higher temperature during outgassing than they will subsequently encounter during the melting. A mold chamber is positioned beneath the housing, there being a passage in the roof of such mold chamber, and also the bottom of the metallurgical furnace beneath which such mold is positionable, for receiving metal cast from the crucible. If desired, the mold chamber can be substantially gastight.

The detailed furnace construction of the invention will now be described with reference to the annexed drawings, following which further aspects of the invention will be explained.

In the drawings:

Fig. 1 is a side elevation, partly in section and with parts broken away, of a furnace construction embodying the present invention;

Fig. 2 is a fragmentary plan view of the lower portion of the furnace construction shown in Fig. 1, particularly of a portion of the door construction of the mold chamber;

Fig. 3 is a top plan view of the novel furnace construction;

Fig. 4 is a vertical sectional view of such furnace taken particularly through the main furnace housing;

Fig. 5 is a fragmentary view of a resistor heating element employed in the construction of Fig. 4;

Fig. 6 is a perspective view of fragments of brick-like graphite elements showing the means for interconnecting same;

Fig. 8 is a side elevation, partly in section and with parts broken away, of a mold chamber employed in the present invention, particularly illustrating the mold moving means;

Fig. 9 is a fragmentary view of a portion of the construction shown in Fig. 8 but in a different operating position; and Fig. 10 is a plan view of the construction shown in Fig. 8.

Figure 7:
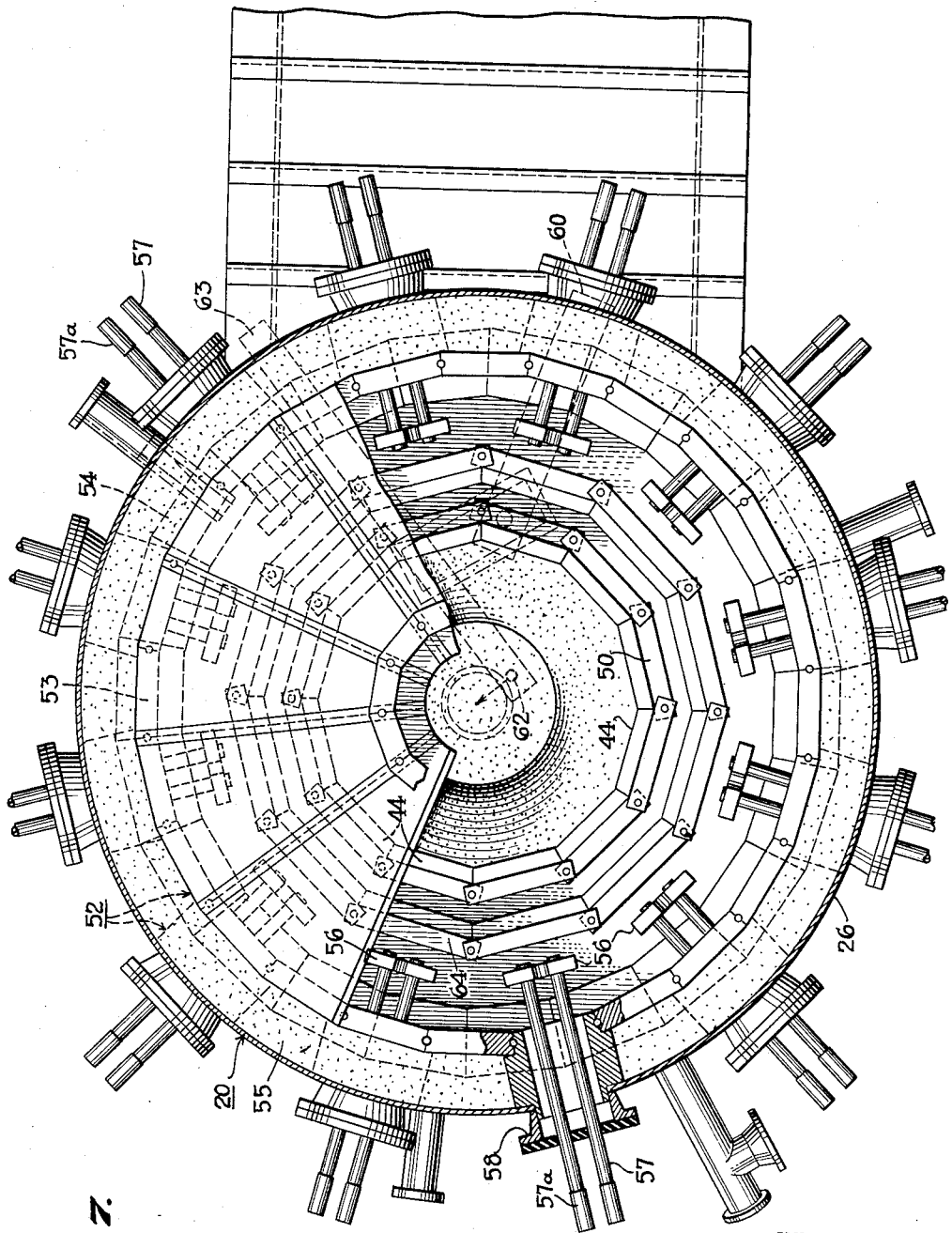
Fig. 7 is a horizontal sectional view of the furnace construction shown in Fig. 4.

Referring to the drawings in greater detail, particularly Figs. 1 and 4, the novel apparatus embodying the metallurgical furnace comprises a furnace chamber proper 20 above which is superimposed, cylindrical housings 27, 32, in the upper of which is slidably mounted, arc electrode heating means 21 for electrically heating a charge of material within a graphite crucible 22 mounted within the furnace chamber proper 20. Also superimposed above the furnace chamber 20 are a scrap hopper 23 and a sponge hopper 24, both of which are provided with suitable feeder means for conveying their respective materials into the furnace chamber 20. Such feeder means comprise, for example, a screw or augur 25 for the sponge hopper 24 and, for example, suitable vibratory conveyor means for the scrap hopper 23. Any other suitable conveyor means can be employed.

The arc electrode 21 may be of the non-consumable type of tungsten or equivalent, for arc melting a charge of scrap and/or sponge fed from the hoppers 23, 24, or it may comprise a consumable electrode of titanium, titanium and alloy chips, or the like for producing part or all of the melt, in which event discharge from the hoppers may or may not be employed.

The furnace chamber 20, of course, embodies a gastight housing designated generally at 26 which is in communication with the aforementioned hoppers 23 and 24 by means of an intermediate chamber 27 in which is located a hopper electrode chamber seal 28 which is pivotally mounted at 29 and under the influence of a power arm 30. The latter is capable of shifting the sealing means 28 angularly to close a throat 31 which is in communication with the aforementioned hoppers 23 and 24. The electrode 21 is axially slidable within the electrode housing 32 which is preferably in alignment with the throat 31 and is provided with a suitable gastight seal 33 to permit such axial movement of the electrode 21 via an electrode supporting shaft 21a.

Located beneath the furnace chamber 20 is a mold chamber 34, the details of construction of which will be more fully set forth below in connection with Figs. 8-10. The mold chamber 34 is designed for housing a mold 35 of carbon or graphite (Fig. 8) which is positionable, as shown in such figure, directly beneath the bottom pour orifice of the crucible 22, also to be explained more fully hereinafter. The mold chamber 34 is gastight and is provided with a gasket sealed door 36 which is hydraulically operable. The mold 35 is mounted upon a mold car 37 which in turn can be moved into and out of the mold chamber 34 under the influence of a pair of sprocket chains 38, one on each side of the mold car 37, which sprocket chains are of the endless variety passing over suitable sprocket wheels 38a, 38b which are under the influence of a motor 38c (Fig. 10) for turning same.

Referring now to Figs. 4-6, the construction of the furnace within the furnace chamber proper 20 will now be described. With the exception of the aforementioned outer metal housing 26 for the furnace chamber proper 20, substantially all parts of the furnace are of graphite slabs, planks, and supports, graphite being employed in contrast to carbon because graphite is subject to substantially less gaseous evolution on heating than is carbon so that the furnace is much easier to degasify. However, at the base of the novel furnace construction certain porous carbon blocks may be employed in lieu of the graphite in order to provide increased thermal insulation and mechanical strength as will appear hereinafter.

The base of the furnace 20 embraces a substantially horizontal bottom plate 26a which is strongly supported by a plurality of steel ribs 39. The bottom plate in turn supports a plurality of carbon floor blocks 40 which themselves have substantial mechanical strength and provide superior thermal insulation as compared to graphite.

The crucible 22 is supported upon a plurality of graphite blocks 41 which are stacked upon one another and in turn which rest upon the bottom blocks 40. The graphite blocks 41 preferably rest upon supporting carbon blocks 42, two of which are shown in Fig. 4. Said carbon blocks 42, which are shown in Fig. 4, are parallel and rest upon the bottom carbon blocks 40.

The two uppermost of the graphite blocks or bars 41 act as a support for the plurality of graphite planks 43 which act as the main support for the floor of the crucible 22.

The graphite planks 43 are parallel to one another and preferably situated 90° in angular relation to the two uppermost graphite bars 41 immediately beneath planks 43.

The sides of the crucible 22, in the form shown, preferably are constituted by a plurality of substantially vertical graphite planks 44 which are held in position between the floor of the crucible and a plurality of horizontal graphite planks 45 comprising the roof thereof and incidentally the roof of the furnace chamber within the housing 26.

If desired, a plurality of relatively thinner graphite planks or slabs 46 may be positioned upon the graphite planks 43 for forming an easily removable floor or inner floor liner of the crucible 22.

The hearth of the crucible 22 thus is made entirely of graphite slabs and the sidewalls of graphite slabs and brick. This composite hearth and sidewall construction is a substantial departure from the monolithic crucible heretofore employed.

Surrounding the substantially vertical graphite planks 44 is a substantially cylindrical and contiguous construction of graphite slabs of brick-like conformation but which have tongues and grooves, as well illustrated in Fig. 6, from the purpose of assisting in interlocking same. A slab 47 thus is provided with a tongue 48 which fits within a groove or corresponding female portion 49 of another slab 50. Aligned bores 50a and 47a respectively in the slabs 50 and 47 come into alignment when the tongues and grooves are fitted into one another. A suitable interlocking pin 51 may be employed for holding same together. The pin 51 may be of graphite or suitable high melting point metal such as molybdenum.

The insulation must be capable of withstanding temperatures up to about 2900° F. (1600° C.) inasmuch as such temperature is substantially above the crucible temperature during melting and is employed for the aforementioned degasification. Consequently there is positioned within the outer housing 26 of the furnace 20 a liner of insulation means generally indicated at 52 and including a plurality of graphite slabs 53, the slabs 45, and a base comprising porous carbon blocks 54, the latter supporting the vertical graphite slabs 53. Interposed between the outer housing 26 and the aforementioned slabs 45, 53 and the porous blocks 54 is a heavy layer of granulated or comminuted graphite 55 or granulated alumina.

The aforementioned auxiliary heating means will now be described. Such means are designed to cooperate with such liner of insulation for heating the furnace interior to a temperature substantially higher than that required by the melt thereby to effect suitable degasification. Disposed about the periphery of the crucible 22, that is, distributed about the vertical substantially cylindrical sides thereof, are a plurality of auxiliary heater elements 56, for example, twelve in number, which comprise U- or hairpin-shaped graphite resistors which are entirely supported by suspension from their upper ends, that is, from their open ends, by means of cooper energizing electrodes 57 and 57a which extend through gastight insulating bushings 58. The copper energizing electrodes 57, 57a which are supported as aforementioned in the bushings 58 are substantially rigid but not entirely so. They provide full mechanical support at the prong ends of the resistors but are capable of being spread under the influence of the expansion of the resistors, that is, under the influence of the spreading apart of the legs of such resistors.

If desired, the outer extremities of the copper energizing electrodes 57, 57a can be water-cooled.

Such heater elements 56 have two functions. One of them is initially to preheat the furnace, as aforementioned, well above any temperature at which it will be subsequently operated in order completely to degasify same, so that no further gaseous evolution will occur at the lower temperature at which melting is effected. The second function of such heater elements is to control the temperature gradient from the interior of the skull to the exterior of the furnace housing during skull melting as explained in copending U.S. patent application of M. B. Vordahl et al., Serial No. 357,704, filed May 27, 1953, involving the building up the skull to appropriate wall thickness and maintaining it there.

The particular design of the heater elements 56 and their supporting structures minimizes the inductance thereof in order that alternating current can be conveniently used. For example, 10 volts may exist across the prongs of a given heater element and all of such elements may be connected externally in parallel.

The above construction must insure that there is an adequate lead-in connection to the graphite resistor 56 and also the mounting of such resistor must accommodate the thermal expansion of the rigid graphite and, in addition to the above, the construction will minimize the tendency toward arcing which is normally encouraged by the low vacuum under which the furnace is normally operated, as noted below.

By virtue of such vacuum within the furnace, appreciable voltages across the prong ends of the resistors may cause arcing. Consequently it is desirable to employ a construction which will minimize the voltages required and still be capable of furnishing adequate electrical energy for the raising of the furnace to the aforementioned substantial degasifying temperture of about 2900° F.

The crucible 22 is electrically connected by suitable means to the ground in order to insure proper action of the electrode 21 above mentioned. An opening, as at 59, may be provided for a graphite connecting element 60 for this purpose.

As aforementioned, the general type of this furnace is the so-called arc-bottom pour furnace. Consequently, a plug 61 is provided which is of a temporary nature and which can be melted out and thus the flow of the molten material started, by means of a stinger electrode 62 mounted upon a main electrode arm 63. The latter may be mounted for angular movement about a vertical axis in the neighborhood of the steel housing 26 in order that the stinger may be angularly shifted out of the way of the down-pouring molten metal after such plug has been burned out.

A safety container 64, if desired, can be mounted upon the floor elements 43 of the crucible but spaced therefrom, the function of such safety container being to receive any leakage of molten material from the crucible 22 and to contain same, at least pending the making of suitable repairs. The safety container 64 is made up analogously to the main crucible walls (44, 47, 50). Situated beneath the plug 61 is a bottom pour sleeve 80 which is vertically disposed in a suitable attitude for insuring that the molten metal is directed into the mold 35 situated directly thereunderneath, as well shown in Fig. 8, upon the mold car 37. The mold chamber 34 is sealed by the aforementioned door 36, having a suitable gasket 36a around the edge thereof for sealing against the lips of the door. The latter is openable and closeable by means of a pair of hydraulically operable power cylinder devices 81, 82, each of which is pivotally mounted at its opposite extremities upon the door and a fixed portion of the frame of the mold chamber 34.

The mold cart 37 is provided with small railroad wheels 65 which are movable upon rails 66, 67 (Fig. 10) upon the floor of the chamber 34 and also upon the rails 68, 69 mounted upon the door 36. The latter pair of rails, of course, is not in position for supporting the cart 37 until the door is fully opened and horizontal, as is shown in Fig. 9.

Each of the aforementioned sprocket chains 38 pass over its respective pair of sprocket wheels 38a, 38b and each sprocket chain 38 is connected to the mold cart 37 by means of a bracket 66. The sprocket wheels 38a, 38b are driven by the electric motor 38c (Fig. 10) whereby the mold cart 37 can be moved back and forth upon its rails.

If desired, suitable means may be provided for separating the chamber of the furnace proper 20 and the mold chamber, that is, a suitable valve or cap may be employed for closing the sleeve 80 and maintaining such chamber separate. For example, a movable cover (not shown) can be mounted beneath the pouring sleeve and can be pivotally mounted for movement into such closing position. The latter may be desirable if argon under pressure is employed within the furnace. Alternatively, if a vacuum is employed therein, such closure may be employed in order to facilitate the withdrawal of the mold 35.

Referring again to Fig. 1, a flanged normally sealed opening 71 may be provided for the insertion of an auxiliary electrode for "hot topping" the ingot in the mold 35 when required.

There is thus provided a novel furnace construction which satisfactorily solves the serious problems of insulation and its degasifying charging while hot and the attainment of adequate safety by simple construction having reliable operation. Illustratively, the novel furnace is capable of producing a 1,000 lb. melt as aforementioned, the main body of the furnace being, for example, about 9 ft. in diameter and about 14½ ft. high. The mold hot topping chamber illustratively is about 4 ft. x 5 ft. x 4 ft. Outgassing or degasifying should be of the order of about 10 microns per minute which can be achieved by initially heating the interior parts of the furnace as above described to a higher temperature during outgassing than such parts will subsequently encounter during the actual melting. The auxiliary heaters 56 admirably accomplish this purpose and their particular construction successfully overcomes the several attendant problems, particularly the problem of support by electrical lead-in connection to the graphite auxiliary heaters, the accommodation of the thermal expansion of the rigid graphite heaters, and the suppression of arcing due to appreciable voltages across the heater terminals. Such hairpin-shaped graphite resistors with their nearly rigid electrical connections are fully mechanically supported at their prong ends and a tapered thread on the water-cooled exterior extremity of the pipes supporting such graphite hairpins preferably is used for electrical connection to minimize electrical resistance and to provide effective cooling of this critical point. The minimization of inductance by this design enables the use of alternating current of illustratively about 10 volts (R.M.S.) across the prongs.

It is highly desirable to limit the heat out-flow, for example, to about 1000 B.t.u. per square foot per hour for the size of furnace shown. This makes it possible to air cool the furnace and to enable the carbon resistors (auxiliary heaters) to achieve the desired temperatures with a reasonable power input. Air cooling is considered particularly desirable from the standpoint of safety because molten titanium reacts immediately with water or oils employed in liquid cooling, to generate steam and hydrogen, productive of explosion. In achieving an insulation limiting heat out-flow to about 1,000 B.t.u. per square foot per hour, the total heat losses in one form of this furnace will illustratively be about 400,000 B.t.u.'s per hour from this source. Thus the electrical requirement amounts to about 115 kilowatts. The structure above described is capable of providing 200 kilowatts by means of the 12 graphite resistors as above set forth. The time required for raising the furnace to temperature is about three days and somewhat longer is required for cooling it off. Thus the practical difficulty arises which necessitates hot charging and ingot removal. Only about two hours arcing time is required to melt the charge with about one hour for preheating the titanium sponge. Thus the total time for one cycle may be as short as for a cold mold furnace of the water cooled, copper crucible type.

Although the hearth of the crucible 22 is shown to be supported upon a quadrangular pile of graphite blocks 41 of log-like configuration, such hearth may be supported on other arrangements of such blocks. Uniformity of current flow in the hearth is desirable to prevent the formation of offcenter skulls. Such uniformity is attained by the support shown in Fig. 4. The outer extremity of the graphite ground lead 60 can be tapped for a water-cooled copper bus leading through a vacuum seal, or, if desired, the ground lead 60 may itself protrude through a suitable vacuum seal 60a (Fig. 4).

In the operation of the furnace, a skull of an appropriate metal, as discussed below, is first formed within the graphite crucible 22. Referring to Figs. 1 and 4, this is most expeditiously effected by introducing a charge of scrap, sponge or the like from the hoppers 23, 24 into the crucible until it is substantially filled. The central portion of the charge is then melted down by means of the arc electrode 21, leaving, however, an unmelted portion of the charge, of substantial thickness, i.e. about an inch to several inches in thickness, lining the side walls and floor of the crucible 22. The charge is then melted through the bottom pore opening in the crucible base by means of the stinger electrode 62 and the molten interior portion of the charge is discharged into the mold 35, Fig. 8. The resulting intergral skull remaining preferably has the configuration in axial actions about as shown at A of Fig. 4. The opening through the base of the skull is now suitably plugged, and a second melt produced therein, about as shown at B of Fig. 4, and the plug melted through to cast the molten contents into a mold, as at 35, Fig. 8.

The second melt may be produced in various ways to provide a melt of desired analysis. If, for example, a melt of unalloyed titanium is desired, the skill cavity may be charged with titanium sponge from one or both hoppers 23, 24, and arc melted, with an electrode 21 of the non-consumable type, such as tungsten, or with a consumable electrode of titanium sponge. The latter has the advantage of a purer melt, since some contamination of the melt by the tungsten electrode usually occurs.

If an alloy of titanium and another meltal or metals is desired, the melt may be produced from a consumable electrode formed of titanium sponge and alloy chips in appropriate proportions. Alternatively, the titanium sponge may be introduced from the hoppers and melted down with a consumable electrode of another metal, such for example, as molybdenum, vanadium, tin, etc. to form the desired alloy of the melt. In accordance with still another modification, the titanium sponge and alloy chips may be introduced from the hoppers 23, 24, respectively, and melted down with a non-consumable electrode, or with a consumable electrode providing a further alloying addition. Various combinations are thus possible to produce desired resulting alloys.

By appropriately selecting the metal of the skull A with reference to the second or succeeding melt B, Fig. 4, important further advantages are obtained. For example, since metals such as molybdenum, columbium and tantalum have much higher melting points than titanium, it is advantageous to melt down titanium within a skull of one of these higher melting metals, thus to minimize the hazard of melting through the skull. Such minor alloying of the titanium with the skull metal as might thus occur is seldom objectionable since molybdenum, columbium and tantalum, together with vanadium, are all beta-isomorphous with titanium, i.e. soluble therewith in all proportions, and hence do not impair the properties of titanium.

Likewise in the production of high melting alloys of titanium, such as a Ti–30 Mo alloy, it is advantageous to melt the same in a skull of the high melting alloying element, molybdenum, rather than in a skull of the much lower melting titanium, as a skull of the latter would tend to melt through in view of the higher melting point of the alloy. The fact that the Ti–30 Mo melt might pick up a small additional amount of molybdenum from the skull, say a percent or so, would of course inappreciably vary the properties of the resulting alloy.

Conversely, many alloys of titanium have considerably lower melting point than pure titanium, such as alloys thereof with metals having relatively low melting points, such as aluminum, tin, antimony, maganese, etc. Such alloys may accordingly be advantageously melted in a skull of pure titanium, due to its higher melting point plus the additional fact that any pick-up of titanium from the skull will not deleteriously affect the resulting alloy.

The air-cooled furnace of the present invention employing the relatively thick walled graphite crucible is ideally adapted to the skull melting technique and is much safer in operation than furnaces of the cold mold type employing the water or oil-cooled, thin-walled copper crucible of conventional design. With furnaces of the latter type employed either for cold mold or skull melting there is always present the hazard of explosion should the arc by wandering, burn through the copper crucible, in cold mold melting, or burn through the skull and crucible in the case of skull melting. As above stated, upon perforation of the crucible wall the molten titanium flowing into the coolant will produce an explosive mixture by generation of steam and hydrogen, which latter upon ignition by the molten titanium may blow the furnace open thus permitting air to rush in and intensify the explosive effect. Such hazards are overcome by the present invention, since no water or oil-cooling of the crucible is employed, and since it would be extremely difficult to burn through the thick, graphite walls of the crucible in any event. In skull melting, should the skull burn through this would merely result in some carbon pick-up by the molten metal from the graphite crucible. This, in general, however, is not objectionable, since carbon has a strengthening action on titanium metal and its alloys, and will not unduly impair ductility if not picked up in an excessive amount. Most titanium base alloys, as well as the pure metal, are materially strengthened without undue embrittlement by additions of up to about ½ percent or so of carbon.

With the skull melting and casting technique of the present invention wherein the molten charge of metal, melted within the skull, is cast into a graphite mold, segregation and variation in alloy analysis throughout the cast ingot is avoided by employment of a mold which is sufficiently massive to provide chill casting. The turbulent pouring action from the crucible into the mold thoroughly admixes the charge which is thereupon immediately chill cast and solidified in the mold to provide an ingot of substantially uniform analysis throughout.

The mold may of course be spun on its axis by conventional means if desired to provide centrifugal casting. In this way a cup-like casting may be produced of dense and uniform structure from which sheet material may be obtained.

Skull melting with the air-cooled graphite crucible furnace of the present invention requires considerably less power input than that required for cold mold, skull melting with a water or oil-cooled crucible.

Melting down of the charge within the skull is effected most rapidly by the use of consumable electrodes and at low furnace pressures on the order of 30 mm. Hg. During melting the furnace is preferably purged continuously at low pressure with an inert gas such as argon, helium or the like.

The skulls formed in the manner above described do not adhere to the crucible walls, but may be lifted out and replaced by other skulls. A series of skulls of various metals may thus be produced, and a skull of an appropriate metal may then be selected and installed for use in melting down a charge of the same or a different metal or alloy.

Thus the combined furnace assembly and skull melting technique of the present invention provides means and method for the contamination-free melting and casting of refractory metals which are highly reactive chemically, particularly in the molten state. Since the melting is carried out under a high vacuum, and preferably in an inert atmosphere, and in the cavity of a skull lining the crucible, composed of a metal which does not react deleteriously with the metal to be melted and case, contamination thereof by embrittling or otherwise injurious elements is entirely prevented for all practical purposes. The melting is, moreover, carried out under conditions such, as above explained, as to reduce hazards to a minimum as compared to conventional practices heretofore employed.

I claim:

1. Apparatus for the melting of a metal of the group consisting of titanium and titanium base alloys comprising: a composite crucible constituted by a plurality of sub-elements of graphite, auxiliary heater means comprising a plurality of U-shaped graphite resistors disposed about the periphery of said crucible and suspended from the upper ends thereof in substantially vertical attitude, flexible means for so suspending said resistors thereby to accommodate expansion thereof, and a substantially gastight housing for said crucible and resistors, said housing having mounted next adjacent thereto thermal insulating means interposed about the periphery and top thereof between said resistors and housing.

2. Apparatus for the melting of a metal of the group consisting of titanium and titanium base alloys comprising: a crucible of graphite planks substantially vertical in attitude and forming the liner for such crucible, the latter including an outer layer of interlocked graphite bricks and a plurality of horizontal contiguous graphite planks forming the floor, such floor having a central opening containing a plug of such metal; a plurality of U-shaped graphite resistors disposed about the periphery of said crucible with the longitudinal axes thereof substantially parallel to those of said vertical graphite planks, a substantially gastight housing for said crucible and resistors, there being interposed between said resistors and housing a layer of slab graphite and one of comminuted graphite, and a plurality of porous carbon blocks positioned on the floor of said housing for supporting said layers and said crucible.

3. A metallurgical furnace for melting highly refractory and reactive metals in relatively large quantity and in such a manner to prevent harmful contamination thereof and to promote homogeneity of the resulting ingot, said furnace comprising: a substantially gastight housing; a crucible mounted thereon in spaced relation to said housing, such crucible consisting of a liner of vertical graphite planks secured to an outer layer of graphite brick interlocked by metal pins, said crucible having a graphite bottom with an aperture therein; thermal insulating means interposed between said crucible and said housing including a cap and side elements each consisting of an outer layer of granulated graphite and an inner layer of solid graphite; electrode heating means disposed within said crucible; supplemental electrical heating means surrounding said crucible peripherally and consisting of a plurality of U-shaped graphite resistors extending the full height of said crucible and a substantial distance therebelow; gastight electrical connections extending through said housing to said electrode heating and supplemental heating means respectively; solid porous carbon blocks positioned at the bottom of said housing for supporting said thermal insulating means and said crucible; and gastight connections extending into said housing for evacuating the same and introducing an inert atmosphere therein.

4. A metallurgical furnace for melting and casting highly refractory and reactive metals in relatively large quantities and in such manner as to prevent harmful contamination thereof, said furnace comprising: a substantially gastight housing; a crucible disposed therein together with a first heating means for electrically heating the interior of said crucible; said crucible including a plurality of interlocked graphite bricks in the sides thereof and a plurality of graphite planks forming the floor thereof; a second heating means in said housing for electrically heating the exterior of said crucible and for assisting in temperature gradient control in said crucible and including a plurality of graphite resistors disposed peripherally about said crucible; and thermal insulating means interposed between said housing and said second heating means.

5. A metallurgical furnace for melting and casting highly refractory and reactive metals, said furnace comprising a substantially gastight housing; a crucible disposed in such gastight housing together with a first heating means including an electrode for electrically heating a charge located within said crucible, said crucible comprising a plurality of interlocked graphite elements; a second heating means in said housing but located exterior to said crucible including a plurality of graphite resistor elements disposed peripherally around said crucible, said resistor elements being substantially U-shaped and having the longitudinal axis thereof substantially vertical, the open extremity of each of said U-shaped resistor elements being directed upwardly, and means for supporting each of said U-shaped resistor elements at the open extremity thereof; thermal insulating means interposed between said housing and said second heating means and including a continuous layer at the top and sides thereof of a granulated graphite, said layer of granulated graphite being held in place by virtue of its interposition between said housing and a layer of solid graphite comprising a plurality of planks of the latter material; a plurality of porous carbon blocks for supporting said last-mentioned layer of solid graphite and a second plurality of porous carbon blocks for supporting said crucible.

6. A furnace according to claim 5 wherein a mold is disposed beneath said crucible within a separate mold housing, the latter housing being separated from the former by means of a movable door including means for sealing the door when in a closed position thereby gaseously separating the two housings.

7. A metallurgical furnace for melting and casting highly refractory and reactive metals in such a manner as to prevent harmful contamination thereof, and in such a manner as to produce such metal in substantial quantities, said furnace comprising: a substantially gastight housing; a crucible mounted in such housing and in spaced relation thereto, such crucible comprising a plurality of subdivided and interconnected graphite elements, said crucible having an aperture in the bottom thereof; thermal insulating means interposed between said crucible and said housing, such thermal insulating means including a layer of solid graphite spaced from such housing, a plurality of porous carbon blocks for supporting such a layer of solid graphite, and a substantially thick layer of granulated graphite interposed between such housing and said porous carbon blocks; electrode heating means disposed within said crucible for electrically heating the interior thereof; supplemental electrical heating means disposed peripherally around the sides of said crucible and including a plurality of substantially vertical graphite resistor elements, supporting means for each of said graphite resistor elements for supporting same at the upper extremities thereof, such supporting means resting upon such housing; such supporting means including gastight electrical connections extending through said housing to said supplemental heating means; and gastight connections extending into said housing for evacuating the latter and for introducing an inert atmosphere therein.

8. A metallurgical furnace for melting and casting highly refractory and reactive metals comprising: a substantially gastight crucible housing; a crucible mounted therein in spaced relationship to said housing and including a plurality of graphite planks comprising the bottom thereof and a plurality of connected solid graphite elements comprising the sides thereof; a plurality of porous carbon blocks supported upon the bottom of said housing and in turn supporting said crucible in spaced relationship to the bottom of said housing; thermal insulating means interposed between said crucible and said housing, the innermost surface of said thermal insulating means being substantially spaced from the outermost surface of said crucible, said thermal insulating means including a base of porous carbon blocks resting upon the bottom of said housing and supporting a layer of solid graphite elements, said blocks and elements being in spaced relationship to said housing, a layer of comminuted graphite interposed between said housing and said porous carbon blocks and solid graphite elements; heating means interposed between said thermal insulating means and the periphery of said crucible and including a plurality of elongated heating elements disposed peripherally about said crucible and extending from substantially the upper level of said crucible to a point substantially below the floor of the latter; a mold chamber positioned beneath said housing, there being a passage in the roof of said mold chamber and the bottom of said metallurgical furnace beneath which such mold is positionable for receiving metal cast from said crucible; said mold chamber being substantially gastight; and means for sealing said passage.

9. A metallurgical furnace for melting and casting highly refractory and reactive metals, said furnace comprising: a substantially gastight housing; a crucible disposed therein in spaced relationship to said housing together with a first means for electrically heating the interior of such crucible, and a second means for electrically heating the exterior thereof, such second means comprising a plurality of graphite resistor elements positioned peripherally about said crucible and extending substantially from the uppermost level of said crucible to a point substantially below the floor of the latter; and thermal insulating means interposed between said housing and said resistor elements.

10. A metallurgical furnace for melting and casting highly refractory and reactive metals in substantial quantity in such a manner as to prevent harmful contamination thereof, said furnace comprising: a substantially gastight housing; a crucible mounted in such housing in spaced relationship to the latter, the floor of said crucible being supported by a plurality of porous carbon blocks in spaced relationship from the floor of said housing; thermal insulating means interposed between said housing and said crucible and in substantially spaced relationship from the latter whereby the side surfaces of said crucible are spaced from the innermost surfaces of said thermal insulating means but the upper lip of said crucible is in engagement with the undersurface of the upper portion of said insulating means, the latter being positioned along the sides and under the roof of said gastight housing; and a plurality of heater elements disposed peripherally about the sides of said crucible and interposed between the latter and said thermal insulating means, said heater elements extending substantially beneath the floor of said crucible, said crucible having an aperture in the bottom thereof through which metal can be cast therefrom.

11. A metallurgical furnace for melting and casting highly refractory and reactive metals, said furnace comprising: a substantially gastight housing, such gastight housing having a roof and side portions, a graphite layer next adjacent said roof and side portions and comprising thermal insulating means; a crucible mounted within said housing and within said thermal insulating means whereby the sides and the floor of such crucible are in spaced relationship to such thermal insulating means, the upper edge of such crucible being in engagement with such thermal insulating means; electrode heating means disposed within said crucible for heating the interior thereof; supplemental electrical heating means surrounding said crucible and interposed between the latter and said thermal insulating means, such supplemental heating means being disposed peripherally about the sides of said crucible and extending substantially below the lowermost level of such crucible; porous carbon blocks and graphite block means for supporting said crucible in the beforementioned position, such crucible having an aperture in the bottom thereof through which metal may be cast therefrom; and a substantially gastight mold chamber positioned beneath said metallurgical furnace for containing a mold, the latter being positionable beneath such aperture.

12. A furnace for melting refractory metals of high chemical reactivity, comprising: an outer substantially gastight housing, an inner housing of structural graphitic and carbon elements mounted within said outer housing, refractory thermal insulating means disposed between said housings, a crucible of graphite mounted on graphite supports within said inner housing, arc electrode means, and means mounting the same on said outer housing for slidable displacement into and out of said crucible.

13. In a furnace according to claim 12, a mold displaceably mounted within said gastight housing beneath said crucible, said housing having an opening therein for removing said mold therefrom and having means adapted to form a gastight seal therewith for closing said opening and means for casting a charge of molten metal from said crucible into said mold.

References Cited in the file of this patent

UNITED STATES PATENTS

| | | |
|---|---|---|
| 1,286,135 | Somermeier | Nov. 26, 1918 |
| 1,880,806 | Cioffi | Oct. 4, 1932 |
| 2,285,837 | Ridgway | June 9, 1942 |
| 2,475,452 | Jouannet | July 5, 1949 |
| 2,579,885 | Upper | Dec. 25, 1951 |